United States Patent [19]

Maehara

[11] Patent Number: 4,691,969
[45] Date of Patent: Sep. 8, 1987

[54] ANTISKID CONTROL SYSTEM

[75] Inventor: Toshifumi Maehara, Saitama, Japan

[73] Assignee: Akebono Brake Industry Co., Ltd., Tokyo, Japan

[21] Appl. No.: 896,137

[22] Filed: Aug. 12, 1986

[30] Foreign Application Priority Data

Aug. 22, 1985 [JP] Japan .................. 60-184572

[51] Int. Cl.$^4$ ............................................. B60T 8/42
[52] U.S. Cl. .................................. 303/113; 303/116; 303/119
[58] Field of Search ............... 188/181 A; 303/92, 95, 303/96, 103, 110, 111, 113, 116, 119

[56] References Cited

U.S. PATENT DOCUMENTS 3,741,611  6/1973  Depenheuer ................. 303/119
4,561,701 12/1985  Fujii et al. ................... 303/119

Primary Examiner—Duane A. Reger
Attorney, Agent, or Firm—Toren, McGeady & Associates

[57] ABSTRACT

An antiskid control system for a vehicle, comprises a gate valve device inserted in a braking hydraulic pressure transmission line disposed between a master cylinder device and a braking device and is provided with a valve mechanism receives a pressure fluid from a pressure accumulator and is arranged to close the braking hydraulic pressure transmission line and to initiate communication with the braking device through a branch line; an electromagnetic valve device including a first solenoid valve which is arranged to normally close a transmission pressure fluid supply line provided for supplying the pressure fluid from the accumulator to the gate valve device and to open the transmission pressure fluid supply line when the pressure of the braking device must be lowered and a second solenoid valve which is arranged to normally open a hydraulic pressure release line to release hydraulic pressure from the pressure fluid input chamber of the gate valve device to a reservoir and to close the release line when the pressure of the braking device must be lowered; and a braking hydraulic pressure control device including a control fluid chamber connected to the branch line coming from the gate valve device and a control piston arranged to increase or decrease the internal volume of the control chamber approximately in proportion to the value of the hydraulic pressure which is received from the pressure fluid input chamber of the gate valve device.

3 Claims, 1 Drawing Figure

U.S. Patent   Sep. 8, 1987   4,691,969
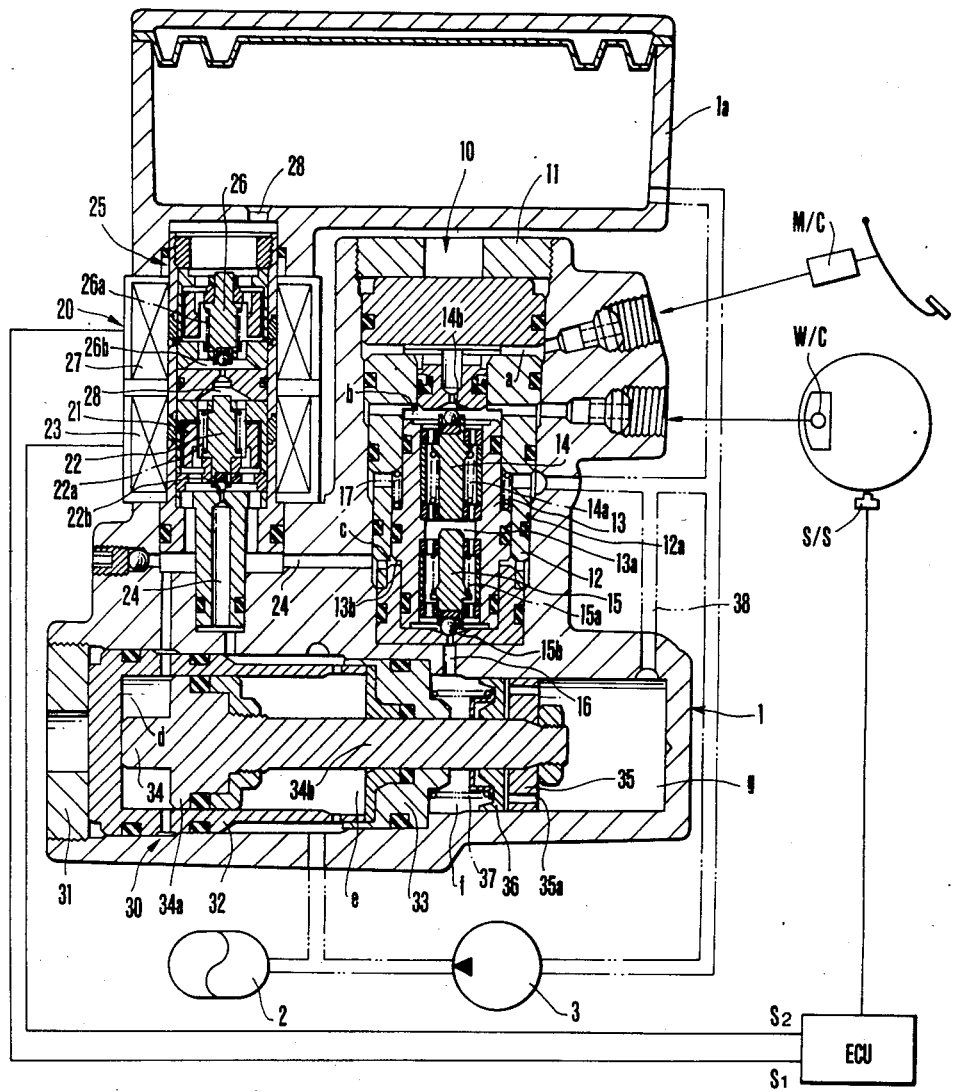

ANTISKID CONTROL SYSTEM

BACKGROUND OF THE INVENTION

1. Field of the Invention

This invention relates to an antiskid control system for a vehicle.

2. Description of the Prior Art

There are various known antiskid control systems which have been contrived to prevent occurrence of a locked state of wheels of a vehicle during brake application by reducing any excessive wheel braking force for adequate contact of wheels with the road surface. An example of antiskid control systems of this kind is disclosed, for example, in U.S. Pat. No. 4,215,902.

The antiskid control system of this kind must meet the following requirements: When any variation of the braking hydraulic pressure within the braking device is transmitted as it is to the master cylinder device during antiskid control, the brake pedal of the vehicle is affected by a kick back resulting from the variation. This gives an abnormal feeling to the operator of the vehicle and, therefore, must be prevented. In addition to this, at the start of antiskid control, if braking pressure fluid is introduced into the braking device in an excessively large amount, a wheel locking state would saliently appear. To avoid the locked state, therefore, excessive introduction of the braking pressure fluid into the braking device should be avoided as much as possible. Further, the increase, decrease or retention of braking hydraulic pressure must be controlled promptly and stably as necessary according to the wheel velocity. Therefore, the antiskid control system must be designed with these requirements duly taken into consideration.

SUMMARY OF THE INVENTION

This invention is contrived to meet these requirements. It is therefore a general object of this invention to provide an antiskid control system which is capable of adequately meeting these requirements despite of the relatively compact structural arrangement of the system.

It is a more specific object of this invention to provide a stable and highly reliable antiskid control system which does not bring about any adverse effect on the braking hydraulic pressure system of a normal operation channel even in the event of a failure in an antiskid control channel.

To meet these objects, an antiskid control system embodying this invention comprises: a gate valve device inserted in a braking hydraulic pressure transmission line disposed between a master cylinder device and a braking device and is provided with a valve mechanism which receives a pressure fluid from a pressure accumulator and is arranged to close the braking hydraulic pressure transmission line and to initiate communication with the braking device through a branch line; an electromagnetic valve device including a first solenoid valve which is arranged to normally close a transmission pressure fluid supply line provided for supplying the pressure fluid from the accumulator to the gate valve device and to open the transmission pressure fluid supply line when the pressure of the braking device must be lowered and a second solenoid valve which is arranged to normally open a hydraulic pressure release line to release hydraulic pressure from the pressure fluid input chamber of the gate valve device to a reservoir and to close the release line when the pressure of the braking device must be lowered; and a braking hydraulic pressure control device including a control fluid chamber connected to the branch line coming from the gate valve device and a control piston arranged to increase or decrease the internal volume of the control chamber approximately in proportion to the value of the hydraulic pressure which is received from the pressure fluid input chamber of the gate valve device.

BRIEF DESCRIPTION OF THE DRAWING

The accompanying drawing is a cross-sectional view of the antiskid device according to the present invention.

DETAILED DESCRIPTION OF THE PREFERRED EMBODIMENT

An embodiment of this invention is arranged as described below with reference to the accompanying drawing:

A reservoir 1a is formed in the upper part of a cylinder body 1 in one unified body with the latter. Within the cylinder body 1 are disposed a gate valve device 10; an electro-magnetic valve device 20 and a braking hydraulic pressure control device 30. These devices are interconnected by fluid passages. The details of these devices are arranged as described below:

Gate Valve Device 10: An inner cylinder member 12 which is in a tubular shape opening at one end is secured to the inside of the cylinder body 1 by means of a plug 11. The inner cylinder member 12 includes a cylinder 12a. A stepped balance piston 13 is slidably inserted in the cylinder 12a. A fluid passage 13a is formed to axially pierce the balance piston 13. Valve elements 14 and 15 are provided at both ends of the piston 13. The valve elements 14 and 15 are arranged to be fitted into the stem of the balance piston 13. Holding springs 14a and 15a are arranged to keep the valve elements 14 and 15 in their initial biased positions of protruding from the ends of the balance piston 13. The balance piston 13 has its one end facing an output fluid chamber b. The above-stated valve element 14 is opposed to a valve seat 14b which is provided with an opening for allowing the output fluid chamber b and an input fluid chamber a to communicate with each other. Meanwhile, at the other end of the balance piston, the other valve element 15 is opposed to another valve seat 15b which is provided with an opening for allowing the output fluid chamber b to communicate with a branch line 16. A return spring 17 is arranged to push the balance piston 13 downward as viewed on the drawing to cause the valve element 15 to abut on the valve seat 15b. The return spring 17 thus also causes the valve element 14 to stay away from the valve seat 14b and to be in the initial biased position. A fluid chamber facing the outer circumferential stepped part 13b of the balance piston 13 forms a pressure fluid input chamber c which is arranged to move the balance piston 13 against the force of the return spring 17. When pressure fluid is supplied to the pressure fluid input chamber c, the balance piston 13 moves to cause the valve element 14 to abut on the valve seat 14b. Then, this blocks the communication between the input and output fluid chambers a and b and causes the valve element 15 to part from the valve seat 15b thus allowing the output fluid chamber b to communicate with the branch line 16.

The input fluid chamber a is connected to a master cylinder device M/C. The output fluid chamber b is connected to a wheel cylinder W/C of a braking device.

Electro-Magnetic Valve Device 20: In this specific embodiment, the electro-magnetic valve device 20 consists of a first solenoid valve 21 including a valve element 22 which is arranged to normally close a passage 24 provided for introducing a pressure fluid from a pressure accumulator 2 to the pressure fluid input chamber c of the gate valve device 10 and to open this passage 24 when a solenoid 23 is energized; and a second solenoid valve including a valve element 26 which is arranged to normally open a passage 28 leading to the reservoir 1a and to close the passage when a solenoid 27 is energized. A holding spring 22a is arranged to normally keep the valve element 22 in pressed contact with a valve seat 22b. Meanwhile, another holding spring 26a is arranged to normally keep the valve element away from a valve seat 26b.

Braking Hydraulic Pressure Control Device 30: The braking hydraulic pressure control device 30 of this embodiment is secured to the inside of the cylinder body 1. The device 30 includes a stepped control piston 34 which is slidably inserted within an inner cylinder member consisting of members 32 and 33. The control piston 34 is in the following relation to fluid chambers d, e, f and g which are arranged independently of each other: The fluid chamber d is normally in communication with the pressure fluid input chamber c of the above-stated gate valve device. A larger diameter flange part 34a of the control piston 34 (having an area $A_1$) is facing this fluid chamber d. The fluid chamber e is formed as a part of a line provided between the pressure accumulator 2 and the first solenoid valve 21 (normally closed type). The end face (having an area $A_2$ which is smaller than $A_1$) of the larger diameter flange part 34a of the control piston 34 on the side of the smaller part 34b of the piston 34 is facing the fluid chamber e. The fluid chamber f serves as a control fluid chamber which is connected to the branch line 16. The smaller diameter stem part 34b of the control piston 34 is inserted into this fluid chamber f. A flange disc 35 is attached to the fore end of the smaller diameter stem part 34b of the control piston 34 in one unified body with the latter. The control fluid chamber f is arranged to have its internal volume increase when the control piston 34 moves to the right as viewed on the drawing. The fluid chamber g forms an atmospheric pressure chamber g and is in communication via a line 38 with the reservoir 1a. A fluid passage 35a is formed in the flange disc 35. A unidirectional piston cup 36 is arranged to permit a fluid flow from the atmospheric pressure chamber g to the control fluid chamber f. A reference numeral 37 denotes a set spring. A pump 3 is provided for sucking up the fluid of the reservoir to the pressure accumulator 2.

In the embodiment which is arranged as described above, the solenoids 23 and 27 of the first and second solenoid valves 21 and 25 included in the electromagnetic valve device 20 are arranged to be energized or excited by signals produced as antiskid signals from an electronic control unit (hereinafter referred to as ECU) according to a wheel velocity condition detected by a speed sensor S/S during brake application. Assuming that the signal for exciting the solenoid 23 is $S_1$ and the signal for exciting the solenoid 27 is $S_2$, the ECU produces both the signals $S_1$ and $S_2$ when the pressure of the braking device must be lowered. In this instance the first solenoid valve 21 is shifted from a closed state to an open state while the second solenoid valve 25 is shifted from an open state to a closed state. In case that the pressure of the braking device must be increased, the ECU stops producing the signals $S_1$ and $S_2$ to bring the solenoid valves 21 and 25 back to their initial states. An output circuit required for producing the signals $S_1$ and $S_2$ for antiskid control can be arranged in accordance with the arrangement of a known antiskid control circuit.

The antiskid control system which is arranged as described above operates as follows:

During ordinary brake application: In this case, when the first solenoid valve 21 closes and the second solenoid valve opens, the hydraulic pressure within the pressure fluid input chamber c of the gate valve device 10 is released to the reservoir 1a. Accordingly, the gate valve device is in a state as shown in the drawing. The input fluid chamber a and the output fluid chamber b are in a state of communicating with each other. The hydraulic pressure of the master cylinder device M/C is transmitted directly to a wheel cylinder W/C.

During antiskid control: In that case, the signals $S_1$ and $S_2$ are supplied to excite the solenoids 23 and 27. The first and second solenoid valves 21 and 25 are operated by these signals respectively. Then, the braking hydraulic pressure is decreased or increased in the following manner:

(1) In decreasing the braking hydraulic pressure: With the signals $S_1$ and $S_2$ supplied, the first solenoid valve 21 opens and the second solenoid valve 25 closes. As a result, the pressure fluid of the pressure accumulator 2 is transmitted via the line 24 to the pressure fluid input chamber c of the gate valve device 10. The balance piston 13 moves upward as viewed on the drawing. The valve element 14 abuts on the valve seat 14b to block communication between the input and output fluid chambers a and b. Concurrently with this, the valve element 15 moves away from the valve seat 15b to connect the output fluid chmaber b to the branch line 16.

Meanwhile, the hydraulic pressure of the pressure accumulator 2 is transmitted to the fluid chamber d of the braking hydraulic pressure control device 30. The control piston 33 of the device 30 is moved to the right as viewed on the drawing. The internal volume of the control fluid chamber f then increases. Therefore, the braking hydraulic pressure decreases.

(2) In increasing the braking hydraulic pressure: The signals $S_1$ and $S_2$ cease to be supplied. The solenoid valves 21 and 25 come back to their states as shown in the drawing. The hydraulic pressure of the fluid chamber d gradually withdraws toward the reservoir 1. As a result, the hydraulic pressure of the fluid chamber e causes the control piston 33 to move back toward its initial position. The internal volume of the control fluid chamber f decreases to increase the braking hydraulic pressure.

During the above-stated process of control, the gate valve device 10 completely shuts off communication between the master cylinder device M/C and the wheel cylinder W/C. Therefore, variations in the braking hydraulic pressure are never transmitted to the master cylinder device M/C. This ensures that the brake pedal is never affected by any kick back. In this embodiment, the balance piston 13 is arranged to receive no action of hydraulic pressure during normal brake application. Therefore, in the event of a failure in the antiskid control channel, this arrangement ensures a normal braking condition. The embodiment, therefore, has an advantage in terms of fail-safe arrangement.

Further, if a high hydraulic pressure value comes to further increase on the side of the master cylinder device M/C during the process of the above-stated control, the holding spring 14a is compressed by the valve element 14 to permit the pressure fluid of the input fluid chamber a to be transmitted to the output fluid chamber b.

In accordance with the arrangement of the embodiment described, the sliding parts of all the devices are in a state of being immersed in a fluid or oil. This always ensures a satisfactorily lubricated state of all the sliding parts to ensure adequate sliding movement of them. During antiskid control, this arrangement gives a high responsivity while the hydraulic pressure on the side of the master cylinder device can be kept unvarying.

In accordance with this invention, therefore, a highly responsive antiskid control operation can be accomplished, despite of a relatively compact structural arrangement, and the hydraulic pressure variations of the braking device are never transmitted to the master cylinder device during the process of antiskid control. In addition to this advantage, the assured adequacy of lubrication of the sliding parts of the system enhances the reliability and stability of the antiskid control. The invented antiskid control system thus has a great utility.

What is claimed is:

1. An antiskid control system for a vehicle, comprising:
   a gate valve device inserted in a braking hydraulic pressure transmission line disposed between a master cylinder device and a braking device and is provided with a valve mechanism which receives a pressure fluid from a pressure accumulator and is arranged to close said braking hydraulic pressure transmission line and to initiate communication with said braking device through a branch line;
   an electromagnetic valve device including a first solenoid valve which is arranged to normally close a transmission pressure fluid supply line provided for supplying the pressure fluid from said accumulator to said gate valve device and to open said transmission pressure fluid supply line when the pressure of said braking device must be lowered and a second solenoid valve which is arranged to normally open a hydraulic pressure release line to release hydraulic pressure from the pressure fluid input chamber of said gate valve device to a reservoir and to close said release line when the pressure of said braking device must be lowered; and
   a braking hydraulic pressure control device including a control fluid chamber connected to said branch line coming from said gate valve device and a control piston arranged to increase or decrease the internal volume of said control chamber approximately in proportion to the value of the hydraulic pressure which is received from the pressure fluid input chamber of said gate valve device.

2. A system according to claim 1, wherein said gate valve device includes a balance piston which has a fluid passage axially piercing said piston with valve elements disposed at both ends of said balance piston; said balance piston is provided with a stepped part which is arranged on the outer circumference of said piston to face said pressure fluid input chamber; and, when the pressure fluid of said pressure accumulator is introduced into said pressure fluid input chamber during antiskid control, said balance piston moves to close said braking hydraulic pressure transmission line and, at the same time, begins to connect said braking device to said branch line.

3. A system according to claim 1, wherein the control piston of said braking hydraulic pressure control device is provided with a larger diameter flange part which faces a fluid chamber communicating with said pressure fluid input chamber and a smaller diameter stem part which faces a control chamber communicating with said branch line.

* * * * *